(12) United States Patent
Ozanne

(10) Patent No.: US 7,509,907 B2
(45) Date of Patent: Mar. 31, 2009

(54) STEAM FROTHING DEVICE WITH FROTH FLOW REGULATION SYSTEM

(75) Inventor: Matthieu Ozanne, Chessel (CH)

(73) Assignee: Nestec S.A., Vevey (CH)

( * ) Notice: Subject to any disclaimer, the term of this patent is extended or adjusted under 35 U.S.C. 154(b) by 290 days.

(21) Appl. No.: 11/379,899

(22) Filed: Apr. 24, 2006

(65) Prior Publication Data

US 2006/0236874 A1 Oct. 26, 2006

(30) Foreign Application Priority Data

Apr. 25, 2005 (EP) .................................... 05103330

(51) Int. Cl.
*A47J 31/00* (2006.01)
*B01D 47/02* (2006.01)

(52) U.S. Cl. .............................. 99/293; 99/549; 99/526; 99/527; 99/528; 99/529; 99/202; 99/535; 99/211; 99/212; 99/386; 261/DIG. 16; 261/76

(58) Field of Classification Search .................... 99/452, 99/323.1, 293, 279, 300, 287; 261/DIG. 16, 261/76

See application file for complete search history.

(56) References Cited

U.S. PATENT DOCUMENTS 5,295,431 A * 3/1994 Schiettecatte et al. ......... 99/293
6,499,389 B1 * 12/2002 Probst ....................... 99/323.1

FOREIGN PATENT DOCUMENTS

EP 0791321 8/1997
WO WO9100041 1/1991

* cited by examiner

*Primary Examiner*—Shawntina Fuqua
(74) *Attorney, Agent, or Firm*—Bell, Boyd & Lloyd LLP

(57) ABSTRACT

A frothing device adaptable to a steam outlet for producing milk froth comprising a steam inlet, a milk inlet, an air inlet, a vacuum chamber adapted to receive steam, liquid milk and air therein, a restriction with a limited cross-section adapted for conducting the product there through at high velocity, an emulsifying chamber; the emulsifying chamber having an outlet for draining the product froth out of the chamber and a froth flow regulation system configured for breaking the kinetic energy of the froth stream and for changing its direction sufficiently so that the froth is gently delivered out of the device. The frothing device can be mounted on a coffee machine to deliver cappuccino upon a push of a button.

16 Claims, 5 Drawing Sheets

STEAM FROTHING DEVICE WITH FROTH FLOW REGULATION SYSTEM

BACKGROUND

The present invention relates to a steam frothing device which can be attached to a steam outlet of a coffee machine or of a stand-alone steam producing device, to produce a product froth such as a milk froth. More particularly, the invention relates to an improved device which is capable of gently delivering the froth while maintaining its attributes and quality.

In order to generate frothed milk, a defined amount of air is usually sucked into the stream of milk and steam. Milk is usually sucked into a vacuum chamber by effect of venturi, as a result of a high velocity created by steam injected under pressure. Thus, pressurized steam serves as a vector to move milk and air through a restriction into an emulsifying chamber in which a thorough mixture of milk-steam-air is generated and milk is strongly emulsified to create a stable froth. Devices exist which can be plugged to a steam outlet of a coffee machine to deliver a milk froth according to this principle.

U.S. Pat. No. 6,499,389 B1 relates to a steam froth device of such kind. A nozzle arrangement is disclosed that is disposed downstream of a steam pipe and has a vacuum chamber, into which a milk supply line terminates. An air conduit connects to the milk supply line upstream of the vacuum chamber. An emulsifying chamber is disposed downstream of the vacuum chamber, with the emulsifying chamber having a chamber wall, a floor, a central flow-diverting protrusion and an outlet. The central, flow-diverting protrusion is embodied as a flow trap surrounding the outlet.

SUMMARY

The present invention relates to an improvement of a steam-frothing device of this kind.

One problem that is experienced in practice with the device of the prior art is that the device tends to cause the product or steam to splash, in particular, in conditions where there is a shortage of milk. For instance, when the milk supply becomes depleted, the ratio of steam to milk increases (for more steam) which so induces a too energetic flow of steam or mixture that comes out of the device. This is a critical issue, as the flow of steam tends to dirty the place, either directly by simply splashing in an uncontrolled manner or indirectly by blowing out the milk froth already made in the cup.

There is also a need for the milk froth and coffee to be able to be prepared, in some instances, from a same location, i.e., without having to move the cup. For example, WO 91/00041 describes an automatic machine for dispensing black coffee and white coffee in which the delivery spout of the coffee dispensing device and the delivery spout of the milk dispensing device are placed close to each other for direct delivery into the cup. However, for practical reason, it is not always possible to have a fixed frothing device at the same place as the coffee delivery device. In particular, the milk delivery device requires more frequent cleaning and positioning it fixedly at the coffee location renders the coffee dispense inconvenient, not to say, impossible for several minutes.

Another problem comes from the velocity at which the froth is expelled out of the device as propelled by the pressurized steam. In case the device is positioned vertically with the delivery outlet being arranged downwardly, the milk froth is sent in the right direction into the cup but when the froth flow is sent too energetically, it can also easily dirty the vicinity of the machine including the coffee delivery outlet which thus requires more frequent cleaning.

Therefore, there is a need for a milk frothing device that can deliver froth in a gentler manner. There is also a need for a coffee machine that can deliver cappuccino beverages in a more convenient and hygienic manner without the too energetic flowing problem aforementioned.

According to one aspect of the invention thereby the device of the prior art is improved with the addition of a froth flow regulation system which breaks the kinetic energy of the froth flow and changes its direction sufficiently so that the froth can be gently delivered out of the device. The kinetic energy is stopped to allow a gentle delivery without it being detrimental to the quality of the froth. Furthermore, an object is also to improve the froth attributes (amount, stability, stiffness, . . . ).

According to another aspect of the invention, the steam frothing device comprises a froth flow regulation system rendering the device positionable in various orientations, e.g., from vertical to an inclined or horizontal position, in order to meet with the demand for a substantially contiguous, direct and/or separate beverage delivery while the froth gently flowing by gravity in a vertical direction. As a result, the user can properly direct the device upon needs without the risk of a jet of froth and/or steam being sent in an uncontrolled manner. The froth will always fall down without angle making the froth delivery predictable.

According to another aspect of the invention, the steam frothing device can be associated to a coffee delivery outlet on a same coffee machine; the two of which being distant sufficiently to be used separately; and the steam frothing device being moveable or orientable in such a way that its delivery outlet can be brought closer to the coffee delivery outlet; the steam frothing device having a froth flow regulation system that is configured to deliver the froth gently at a vertical direction under gravity regardless of the orientation of the steam frothing device. A benefit so lies in that a coffee with milk froth (e.g., cappuccino) can be prepared more conveniently, i.e., on a same spot, and more hygienically, i.e., with less splashing/cleaning issues.

The above objects are achieved by means of the features of the independent claims.

According to an embodiment, the invention relates to a frothing device adaptable to a steam outlet for producing milk froth comprising:

a steam inlet,
a milk inlet,
an air inlet,
a vacuum chamber adapted to receive steam, liquid milk and air therein,
a restriction with a limited cross-section adapted for conducting the product there through at high velocity,
an emulsifying chamber of larger cross section than the restriction from which the product froth is emulsified; the emulsifying chamber having an outlet for draining the product froth out of the chamber,
wherein downstream of the outlet is provided a froth flow regulation system which comprises a flow dampening member positioned in front of the outlet which is configured to break the kinetic energy of the froth stream and to change its direction sufficiently so that the froth is gently delivered out of the device.

In an embodiment, the froth-dampening member is configured to change the direction of the flow, when ejected from the emulsifying chamber, of more than 90 degrees. Preferably, the direction of the flow is changed of about 180 degrees. In other words, the flow of froth coming at high energy out of the outlet of the emulsifying chamber at a first direction is redirected at a second direction that is substantially opposite to the first direction. As a result, most of the flow energy is lost and the froth can so flow at about atmospheric pressure from this redirectional area.

In an embodiment, the flow-dampening member is a reservoir comprising an opening facing the outlet of the emulsifying chamber and a bottom. As "reservoir", it is meant any sort of concave shape with a central opening and raising side walls. The reservoir can be, in a preferred way, a cylindrical shape with a circular bottom. The reservoir can also be a bowl, for example, a substantially hemi-spherical shape.

In an embodiment, the flow-dampening member has a substantially cylindrical shape and terminates by a bottom surface.

The reservoir aims at dampening the flow of steam or mixture and must be dimensioned accordingly. The whole stream must be broken or stopped, therefore, the reservoir must be of a sufficient depth and of a sufficient diameter to accommodate in a dynamic manner the volume of liquid exiting the emulsifying chamber.

In one possible construction, the dampening member can be attached to an outer annular portion of the froth flow regulation system by several spokes which demarcate in-between several froth delivery outlets. The advantage is so a symmetrical system along the central axis which enables to house it in one piece within the device thus making an easy and low cost arrangement. The system can thus be moulded in one piece and attached to the frothing device via a socket or any similar connection means.

Therefore, the flow-dampening member may have an opening diameter of at least 4 mm, preferably of between 5 and 20 mm, and a depth of at least 5 mm, preferably, of between 7 and 20 mm.

In order for the froth to be delivered into a cup or so, the froth flow regulation system has at least one froth delivery outlet. The froth delivery outlet is configured to be radially offset with respect to the outlet of the emulsifying chamber. As a result, the stream of steam or froth cannot be released directly with high energy but is broken in the dampening member before it is released.

The form of the outlet is not critical but in a preferred mode, the froth delivery outlet is substantially at least one annular portion extending about the flow-dampening member. Such configuration ensures a compact, narrow design of the device while providing a sufficiently wide path for the froth to leave at a sufficient flow rate. Also, by not being too narrow, the outlet does not damage the froth which has been produced in the device.

For example, the delivery outlet has a radial width of at least 1 mm, preferably between 2 and 5 mm. The external diameter of the delivery outlet can be of between 8 mm and 30 mm, preferably between 10 and 20 mm.

In another aspect, the invention relates to a frothing device which comprises a froth flow regulation system which is configured to break the kinetic energy of the froth stream in a manner effective for the froth to flow in substantially vertical direction by gravity even when the device is positioned at a certain inclination with respect to vertical.

In further another aspect, the invention relates to a coffee machine wherein the coffee delivery outlet and the steam frothing device are set on the machine so that they are distant one another of a distance effective to serve coffee and milk froth independently; the steam frothing device being in such configuration arranged to deliver milk froth in a substantially vertical manner. The main improvement of the coffee machine is thus that the steam frothing device is moveable in at least two positions; one position being so that its delivery outlet is moved at a distance closer to the vertical line of the coffee outlet in a manner that the milk froth can be delivered without substantially moving the cup underneath and that the steam-frothing device comprises a froth flow regulation system configured for the milk froth to flow in substantially vertical direction substantially only by effect of gravity when the device is positioned at a certain inclination with respect to vertical.

As a result of these improvements, it is made possible to deliver both a froth independently or a cappuccino (i.e., milk froth then coffee) from a same place, i.e., without having to move the cup, and, importantly, with the stream of froth being delivered in a predictable path, consequently without having a risk of messing the service area.

Additional features and advantages are described herein, and will be apparent from, the following Detailed Description and the figures.

DETAILED DESCRIPTION

Figure 1:
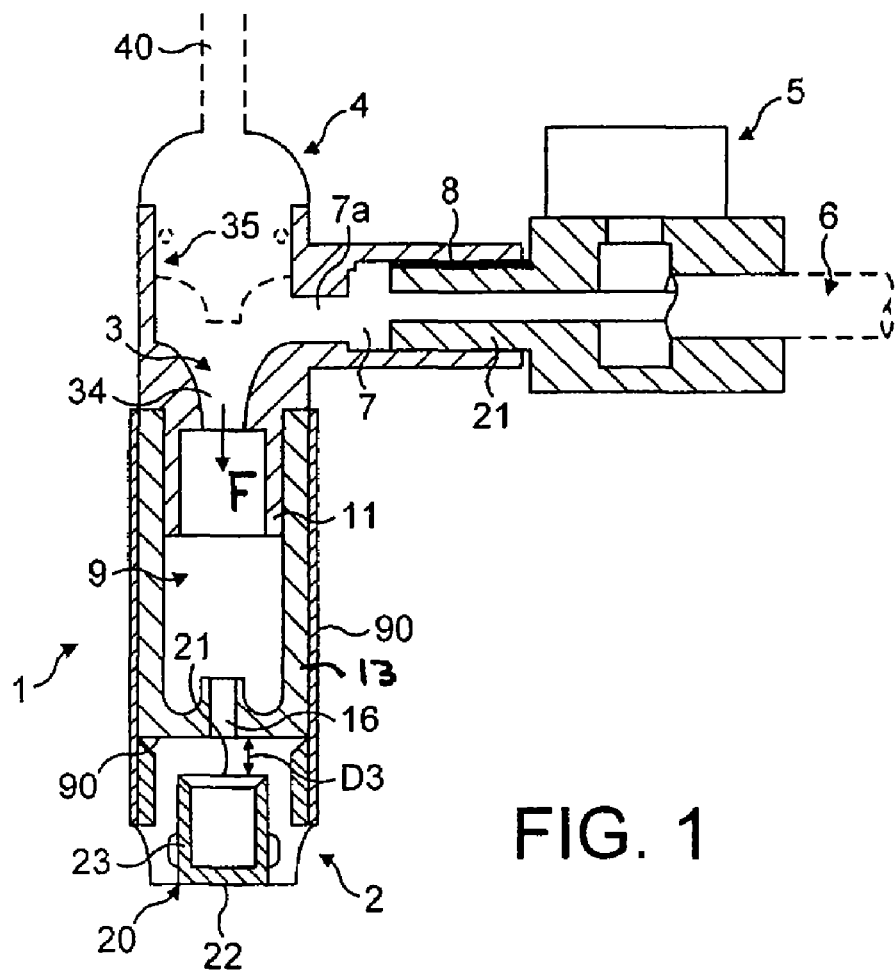
FIG. 1 shows a first cross section view of the steam frothing device according to the present invention.
Figure 2:
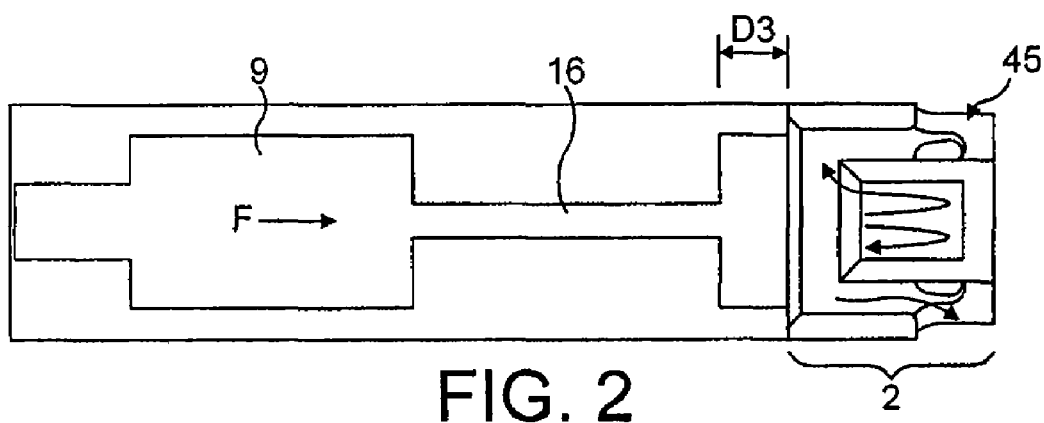
FIG. 2 shows a schematic partial view of the device showing how the froth flow regulation system functions.
Figure 3:
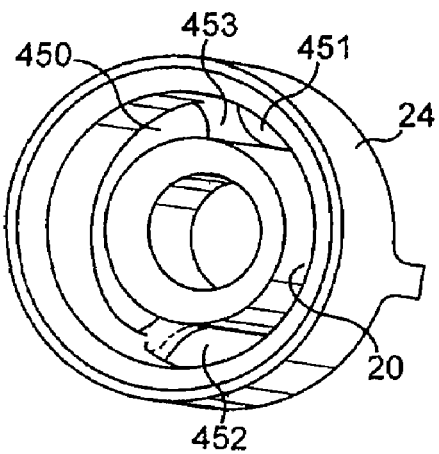
FIG. 3 shows an isolated perspective rear view of the froth flow regulation system.
Figure 4:
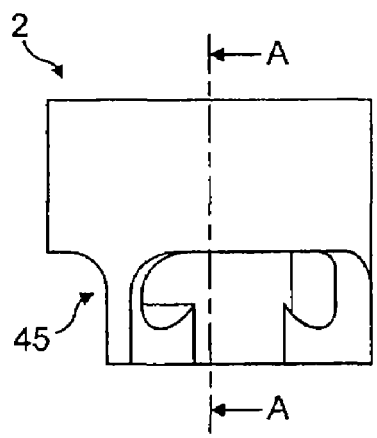
FIG. 4 shows an isolated side view of the flow regulation system.

FIG. 1 shows a cross sectional view of a steam-frothing device 1, or nozzle arrangement, which can be mounted on a steam outlet 4 of a coffee machine for making cappuccino type beverages. The steam-frothing device 1 is connected by a steam inlet 35 to the fluid supply line 40, which is fed by a steam generator, of an espresso machine for instance.

The steam-frothing device 1 comprises a vacuum chamber 3 connected by way of a flow-quantity-limiting element 5 to a milk supply line 6, which originates from an external milk container. A premix chamber 7, into which an air conduit 8 terminates is formed between the vacuum chamber and the flow-quantity-limiting element 5, on an end face of a cylindrical shoulder 21 of the limiting element 5. The premix chamber 7 and the vacuum chamber 3 are linked by a channel or section 7a of reduced section as compared to the section of the chamber 7.

At its downstream end, the vacuum chamber 3 changes over into a restriction 34, which leads to an emulsifying chamber 9. An arrow F indicates the primary flow direction which also defines the primary direction of the device when one refers to its orientation in space of the device.

The emulsifying chamber can be stepped as illustrated with a first segment 11 and a second concentric segment 13 of larger diameter. In alternative the emulsifying chamber is of relatively continuous (constant or varying) section along its length.

In order to slow down the frothed liquid, the emulsifying chamber ends by a bottom surface which causes part of the stream to loose kinetic energy. A central outlet 16 is provided to enable the frothed liquid to leave the emulsifying chamber.

As shown in FIG. 1 to 4, downstream of the emulsifying chamber is provided a froth flow regulation system 2 which aims at further slowing the stream of froth down when coming out of the emulsifying chamber. It has indeed being noticed that with the emulsifying chamber described, the stream of froth was not sufficiently slowed down to deliver the froth gently, i.e., without risk of splashing, in particular in milk depleting conditions.

In order to avoid this problem, a froth flow regulation system has been mounted which comprises a flow-dampening member 20 which has the form of a reservoir whose opening 21 faces the outlet 16 of the emulsifying chamber. The reservoir also comprises a closed bottom 22 extending substantially transversally to the direction of the flow and side walls 23 that raise upwardly or in the direction of the flow.

Therefore, when the flow of frothed liquid exits the outlet 16 at a relatively high speed, it enters the flow-dampening member 20 which forms a buffer volume for the frothed liquid. The direction of the frothed liquid is radically changed at about 180 degrees by impacting on the bottom 22 of the reservoir. The reservoir must be a cavity of sufficient volume to dynamically receive all the frothed liquid that enters and exits the reservoir while its kinetic energy has been significantly reduced. The volume also must not be too narrow to not damage the network of fine liquid bubbles created during the emulsifying stage in the emulsifying chamber.

In particular, the opening of the reservoir should have a diameter D1 of at least 4 mm, preferably comprised between about 5 and 20 mm. The depth D2 of the reservoir should be of at least 5 mm, preferably between about 7 and 20 mm. The distance of the flow-dampening member may also be important to leave a sufficient clearance for the dampened frothed liquid to flow freely outwardly. This distance D3 may be, for instance of at least 1.5 mm, preferably between 2 and 10 mm.

The froth flow delivery system further has at least one delivery outlet 45, defined between an outer portion of casing 24 and the dampening member 20, of sufficient room for the froth to fall down at low pressure or, even preferably, at gravity pressure after having been dampened.

In the illustrated preferred example, there are several portions 450, 451, 452 of outlet arranged radially about the flow-dampening member to enable the volume of frothed liquid to escape at a sufficient flow rate out of the device. As apparent in FIG. 3, the dampening member 20 is attached to the casing portion 24 by a series of spokes 453 that demarcate in-between the delivery outlets.

For instance, in a preferred mode, the outlet should have a width W of at least 1 mm, preferably comprised between 2 and 5 mm. The external diameter D4, as measured from the internal edges of the outer casing 25 of the system, should be of at least 8 mm, preferably of between 10 and 30 mm.

For cleaning purpose, the froth flow regulation system can be made a detachable part of the device. The part can be produced by moulding in a foodgrade plastic or an elastomeric material. The part 2 can be held with the other elements of the device by a socket 90, for example. The socket can be metallic or hard plastic. The other parts of the device such as the ones defining the chambers 3, 7, 9 can be made of foodgrade plastic or elastomeric material.

Figure 6:
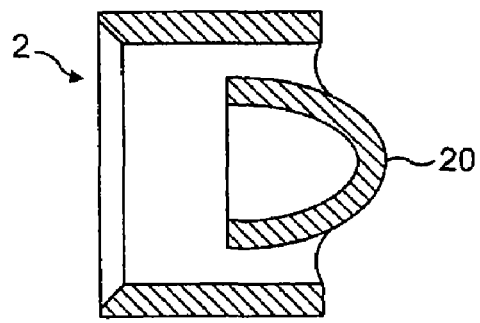
FIG. 6 shows a cross section view of a variant of the froth flow regulation system.

FIG. 6 shows a variant of the froth flow delivery system in which the reservoir 20 is bowl-shaped.

Figure 7:
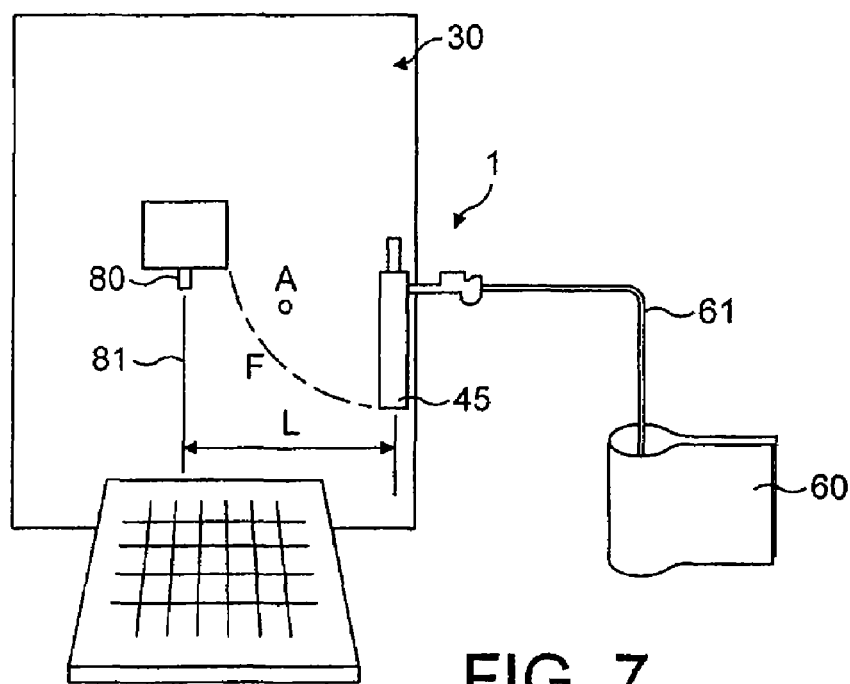
FIG. 7 shows a coffee machine of the invention with its steam-frothing device in a first milk froth delivery configuration.
Figure 8:
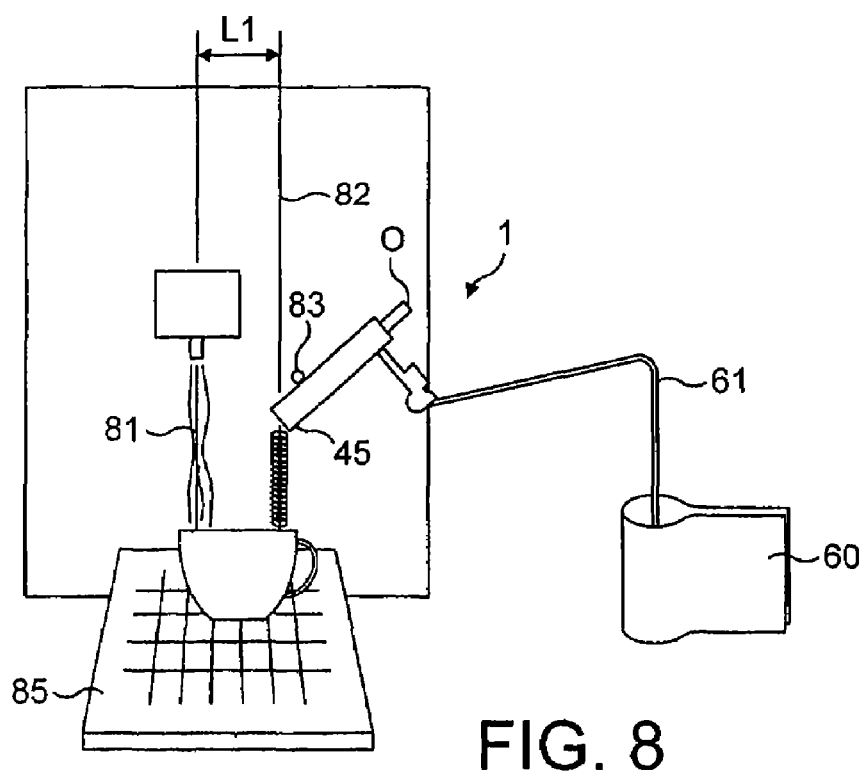
FIG. 8 shows the coffee machine of the invention in a second milk froth delivery configuration.

FIGS. 7 and 8 illustrate a coffee machine that includes a frothing device 1 of the invention which is configured to deliver a milk froth in at least two different configurations. The coffee machine comprises a frame 30, typical internal components including a water heater/steamer (not shown), a coffee delivery outlet 80 adapted to deliver a coffee beverage and the frothing device 1 adapted to deliver a milk froth. The frothing device receives milk from a milk container 60 via a flexible hose or straw 61. The coffee delivery outlet is spaced a certain distance apart the frothing device to enable preparation of a pure coffee beverage or a milk froth independently. The advantage also lies in that the frothing device can be dismantled for cleaning while the machine remains still operational for serving a coffee. Another advantage is also that when preparing a black coffee, the frothing device can be put aside and sufficiently away to avoid a drop of milk to be accidentally poured into the coffee.

However, according to one aspect of the invention, the frothing device 1 is made moveable in such a manner that its delivery outlet 45 can be brought closer to the vertical alignment 81 of the coffee delivery outlet 80. The outlet 45 comes to a vertical line 82 which is close enough to vertical line 81 so that a cappuccino can be prepared without having to move the cup; e.g., the cup being in a static fashion as resting on the drip tray 85. By "close", we mean that the vertical lines 81, 82 should be distant in a cappuccino delivery mode from no more than 60 mm, preferably, no more than 50 mm, even preferably of from 10 to 40 mm; the optimal distance (L1) being 15-30 mm. Since the frothing device of the invention sufficiently dampens the flow of milk froth, the froth can be poured into the cup at about the vertical of the outlet, i.e., along line 82.

The preparation of a cappuccino can further be automated by a program in the machine that activates sequentially the milk frothing cycle before the coffee delivery cycle upon a push of a button, as it is known in the preparation of a cappuccino from automatic coffee machines. As a result, a cappuccino can be prepared in a more convenient manner while the frothing device remaining easy to dismantle and clean. The coffee delivery outlet experiences a lesser risk to be contaminated with milk or steam splashing because the froth showering device, even in a cappuccino delivery configuration, i.e., close to the coffee line, will delivery the milk with no significant lateral projection but at about the vertical of the frothed liquid outlet.

In the illustrated example, the steam-frothing device 1 is made moveable along a mere rotational path about an axis positioned near the upper end of the device, i.e., near or at the steam inlet or conduit. In this case, the frothing device can rotate about axis 0 while its lower end or delivery outlet 45 moving toward the coffee delivery line 80 along arcuate path A. The user can simply manually rotate the device to move it from one position to another. An indexing means such as a pin 83 can be added to ensure that the device is stopped at the correct distance from the coffee delivery means.

Of course, the steam-frothing device can be controllably moveable with respect to the coffee delivery line in many other equivalent ways. For instance, the device can be slidably moved according to a strict horizontal path along a sliding rail. In an alternative, the steam-frothing device can be connected to the machine by a deformable or stretchable link such as a soft plastic or coiled metal tube. In such case, the device can be moved in different axis.

Figure 9:
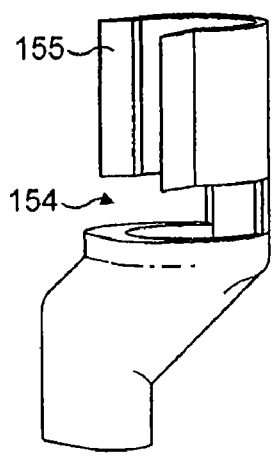
FIG. 9 shows a second variant of the froth flow regulation system of the invention.
Figure 10:
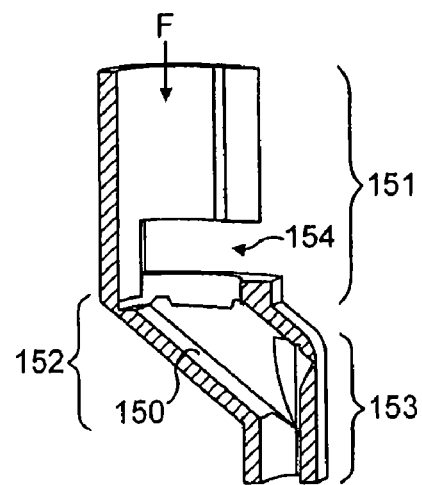
FIG. 10 shows a longitudinal cross section of the system of FIG. 9.

FIGS. 9 and 10 illustrate a variant of the flow regulation system of the invention. The system is made clippable to the end of a conventional steam froth delivery device such as the one described in U.S. Pat. No. 6,499,389 B1; the content of which is incorporated here by reference. The system comprises, in the direction F of the flow, a chicane with at least a biased surface 150 serving as flow dampening member onto which the stream of froth coming out of the upstream emulsifying chamber (not shown) can impact and slow down accordingly.

Figure 5:
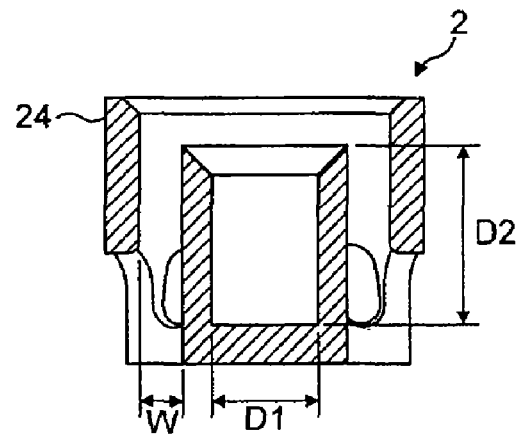
FIG. 5 shows an isolated cross section view of the froth flow regulation system along section A-A of FIG. 4.

More particularly, the system comprises in the direction of flow, a first clippable portion of tube 151 and at least a second portion of tube 152 which is biased with respect to the first portion of tube 151. Preferably, the system also comprises a third portion of tube 153 which is substantially parallel to the first portion of tube and merges with the second portion 152. This third portion serves to guide the flow to the cup when the system is positioned in a vertical arrangement as shown. The first portion of tube has a weakening arrangement with a transversal slot 154 and a longitudinal slot 155 that enables the tubular portion 151 to be slightly deformed outwardly to clip onto the outer surface of the steam frothing device. In that case, the system replaces the system 2 of FIG. 3-5. Of course, the system could be made permanent or integrated to the frothing device in the same vain as the one of FIG. 3-5 and does not necessarily need to be clippable. In that case, the first portion of tube can be made very short and of the diameter of the device. It has been noticed that a proper flow speed reduction was obtained without breaking the froth with such a design.

Figure 11:
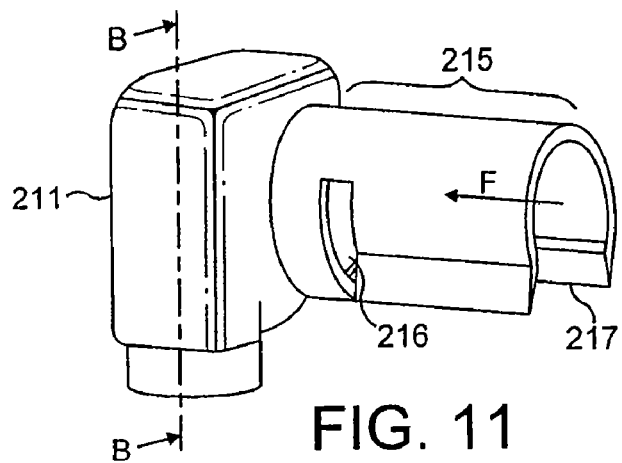
FIG. 11 shows a third variant of the froth flow regulation system of the invention.
Figure 12:
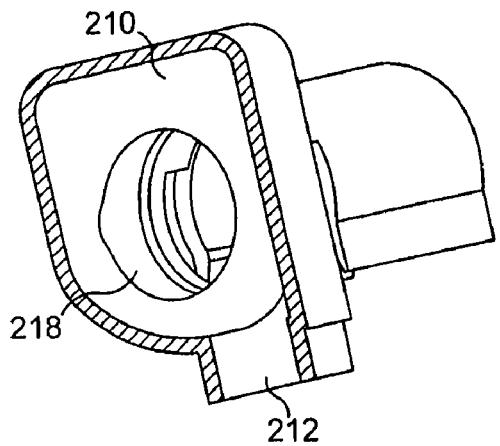
FIG. 12 shows a cross section along line B-B of the system of FIG. 11.

FIGS. 11 and 12 show another variant of the froth flow regulation system 2. The system is also made clippable to a steam frothing device of the kind described in U.S. Pat. No. 6,499,389 or any similar device, although the system can also be thought as an integrated part of the device as a skilled person in the art can deduct. The system comprises in the direction of the flow F, a flow dampening member in the form of a large dampening chamber 210 comprising a front wall 211 in a position substantially transverse to the flow coming out of the upstream emulsifying chamber (not shown). The chamber 210 is larger than the inlet 218 or outlet of the emulsifying chamber (not shown). Preferably the chamber has a larger dimension of at least 15 mm, most preferably 20 mm or more. The dampening chamber thus receives the froth or steam coming at relatively high speed from the emulsifying chamber 9 of the device and dampens it sufficiently by effect of the stream impacting on the surface 211 and the volume of froth occupying the chamber 210 before leaving the chamber by a peripheral outlet portion 212 as a calmed frothed liquid. The system is also provided with a clippable portion of tube 215 with slots 216, 217 making the deformation possible and the tightening to the lower end of the steam frothing device. The flow inlet 218 of the system and the delivery outlet 212 of the system are preferably in two planes perpendicular one another with the chamber in-between making thus the dampening effect particularly effective.

Figure 13:
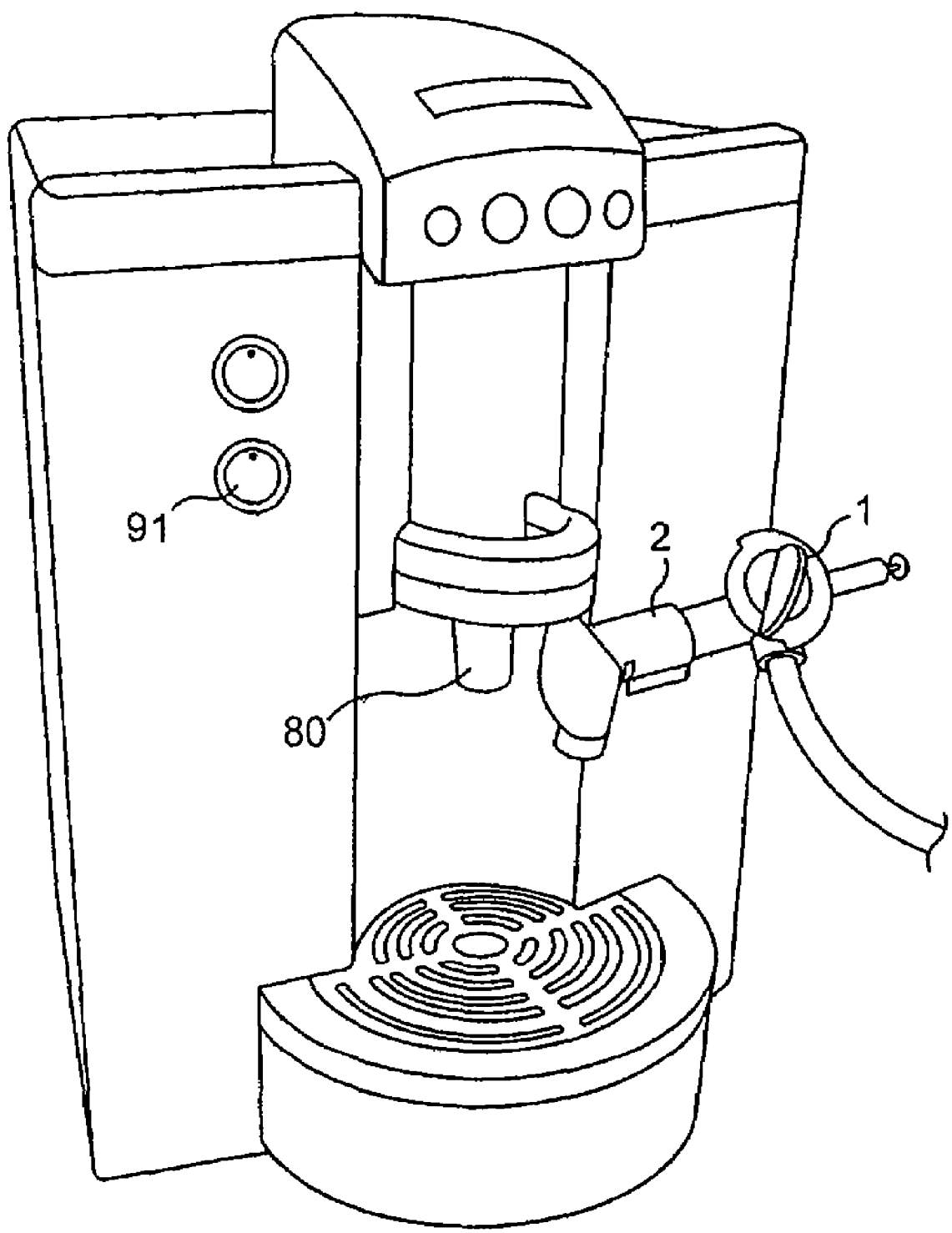
FIG. 13 shows a coffee machine with the system of FIGS. 11-12 clipped to the steam frothing device.

FIG. 13 shows a coffee machine with the system of FIG. 11-12 clipped to the steam frothing device and the steam frothing device being adjusted in non-vertical position, i.e., substantially horizontal, to be able to deliver the frothed product directly in the coffee cup. The coffee machine has a button 91 which commands the direct delivery of a cappuccino beverage by sequential dispensing of a frothed portion of milk through the device 1 with its clipped froth regulation system 2 and then a coffee delivery outlet 80. The machine has, of course, an electronic controller inside that is configured to actuate the two delivery cycles in a proper sequence. The suitable programming of the electronic controller is within the normal skilled of a person of the art.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A frothing device adaptable to a steam outlet for producing milk froth comprising:
a steam inlet,
a milk inlet,
an air inlet,
a vacuum chamber adapted to receive steam, liquid milk and air therein,
a restriction with a limited cross-section adapted for conducting a product there through at a high velocity,
an emulsifying chamber of larger cross section than the restriction from which the product froth is emulsified, the emulsifying chamber having an outlet for draining the product froth out of the chamber in a first direction,
downstream of the outlet is provided a froth flow regulation system which comprises a flow dampening member positioned in front of the outlet which is configured to break the kinetic energy of a froth stream and to redirect the froth stream in a second direction that is substantially opposite to the first direction so that the froth is gently delivered out of the flow regulation system downstream of the outlet of the emulsifying chamber; and
wherein the flow regulation system is so constructed and arranged such that most of the kinetic energy of the froth drained from the outlet of the emulsifying chamber is lost by passage through the flow regulation system.

2. A frothing device adaptable to a steam outlet for producing milk froth comprising:
a steam inlet,
a milk inlet,
an air inlet,
a vacuum chamber adapted to receive steam, liquid milk and air therein,
a restriction with a limited cross-section adapted for conducting a product there through at a high velocity,
an emulsifying chamber of larger cross section than the restriction from which the product froth is emulsified, the emulsifying chamber having an outlet for draining the product froth out of the chamber in a first direction,
downstream of the outlet is provided a froth flow regulation system which comprises a flow dampening member positioned in front of the outlet which is configured to break the kinetic energy of a froth stream and to redirect the froth stream in a second direction that is substantially opposite to the first direction so that the froth is gently delivered out of the flow regulation system downstream of the outlet of the emulsifying chamber; and
wherein the flow dampening member is a reservoir comprising an opening facing the outlet of the emulsifying chamber and a bottom that modifies the flow direction of about 180 degrees.

3. Frothing device of claim 2, wherein the flow dampening member has a substantially cylindrical shape.

4. Frothing device of claim 3, wherein the flow dampening member has an opening diameter of at least 4 mm and a depth of at least 5 mm.

5. Frothing device of claim 3, wherein the flow dampening member has an opening diameter of between 7 and 20 mm and a depth of between 8 and 20 mm.

6. Frothing device of claim 2, wherein the flow dampening member has a bowl shape.

7. A frothing device adaptable to a steam outlet for producing milk froth comprising:
  a steam inlet,
  a milk inlet,
  an air inlet,
  a vacuum chamber adapted to receive steam, liquid milk and air therein,
  a restriction with a limited cross-section adapted for conducting a product there through at a high velocity,
  an emulsifying chamber of larger cross section than the restriction from which the product froth is emulsified, the emulsifying chamber having an outlet for draining the product froth out of the chamber, and
  downstream of the outlet is provided a froth flow regulation system which comprises a flow dampening member positioned in front of the outlet which is configured to break the kinetic energy of a froth stream and to change a direction of the froth stream sufficiently so that the froth is gently delivered out of the device, wherein the froth flow regulation system has at least one froth delivery outlet which is radially offset with respect to the outlet of the emulsifying chamber and wherein the froth delivery outlet is substantially at least one annular portion extending about the flow-dampening member.

8. Frothing device of claim 7, wherein the delivery outlet has a radial width of at least 1 mm.

9. Frothing device of claim 8, wherein the flow dampening member is attached to an outer annular portion of the froth flow regulation system by at least one spoke portion which defines at least one froth delivery outlet.

10. Frothing device of claim 8, wherein the flow dampening member is attached to an outer annular portion of the froth flow regulation system by several spokes which define in-between several froth delivery outlets.

11. Frothing device of claim 10, wherein the outer portion is cylindrical or flared in the flow direction.

12. Coffee machine comprising:
  a coffee delivery outlet,
  a frothing device adaptable to a steam outlet for producing milk froth, the frothing device comprising:
  a steam inlet,
  a milk inlet,
  an air inlet,
  a vacuum chamber adapted to receive steam, liquid milk and air therein,
  a restriction with a limited cross-section adapted for conducting a product therethrough at high velocity,
  an emulsifying chamber of larger cross section than the restriction from which the product froth is emulsified; the emulsifying chamber having an outlet for draining the product froth out of the chamber,
  a froth delivery outlet,
  wherein the coffee delivery outlet and steam frothing device are set on the machine so that they are, in a first position of the steam frothing device, distant one another of a distance effective to serve coffee and milk froth independently, the steam frothing device being so constructed and arranged to deliver milk froth in a substantially vertical manner,
  the steam frothing device is controllably moveable in a second position so that its delivery outlet can be moved closer to a vertical line of the coffee outlet in a manner that the milk froth can be delivered without substantially moving the cup underneath and,
  the steam frothing device comprises a froth flow regulation system configured for the milk froth to flow in substantially vertical direction substantially only by effect of gravity.

13. A frothing device adaptable to a steam outlet for producing milk froth comprising:
  a steam inlet,
  a milk inlet,
  an air inlet,
  a vacuum chamber adapted to receive steam, liquid milk and air therein,
  a restriction with a limited cross-section adapted for conducting a product therethrough at high velocity,
  an emulsifying chamber of larger cross section than the restriction from which the product froth is emulsified, the emulsifying chamber having an outlet for draining the product froth out of the chamber,
  downstream of the outlet is provided a froth flow regulation system which is configured to break the kinetic energy of a froth stream in a manner effective for the froth stream to flow in a substantially vertical direction by gravity even when the device is positioned at a certain inclination with respect to vertical.

14. A frothing device adaptable to a steam outlet for producing milk froth comprising:
  a steam inlet,
  a milk inlet,
  an air inlet,
  a vacuum chamber adapted to receive steam, liquid milk and air therein,
  a restriction with a limited cross-section adapted for conducting a product there through at a high velocity,
  an emulsifying chamber of larger cross section than the restriction from which the product froth is emulsified, the emulsifying chamber having an outlet for draining the product froth out of the chamber, and
  downstream of the outlet is provided a froth flow regulation system which comprises a flow dampening member positioned in front of the outlet which is configured to break the kinetic energy of a froth stream and to change a direction of the froth stream sufficiently so that the froth is gently delivered out of the device, wherein the flow dampening member comprises a chicane with an inclined surface followed by a portion of tube substantially parallel the direction in the emulsifying chamber.

15. A frothing device adaptable to a steam outlet for producing milk froth comprising:
  a steam inlet,
  a milk inlet,
  an air inlet,
  a vacuum chamber adapted to receive steam, liquid milk and air therein,
  a restriction with a limited cross-section adapted for conducting a product there through at a high velocity,
  an emulsifying chamber of larger cross section than the restriction from which the product froth is emulsified, the emulsifying chamber having an outlet for draining the product froth out of the chamber in a first direction, and
  downstream of the outlet is provided a froth flow regulation system which comprises a flow dampening member positioned in front of the outlet which is configured to break the kinetic energy of a froth stream and to redirect the froth stream in a second direction that is substantially opposite to the first direction so that the froth is gently delivered out of the flow regulation system downstream of the outlet of the emulsifying chamber, and wherein the froth flow regulation system is also configured to break the kinetic energy of a froth stream in a manner effective for the froth stream to flow in a substantially vertical direction by gravity even when the device is positioned at a certain inclination with respect to vertical.

16. Coffee machine comprising:

a coffee delivery outlet having a vertical line, a frothing device being adaptable to a steam outlet for producing milk froth, the frothing device comprising:

a steam inlet, a milk inlet, an air inlet, a vacuum chamber adapted to receive steam, liquid milk and air therein, a restriction with a limited cross-section adapted for conducting a product there through at a high velocity, an emulsifying chamber of larger cross section than the restriction from which the product froth is emulsified, the emulsifying chamber having an outlet for draining the product froth out of the chamber in a first direction, and downstream of the outlet is provided a froth flow regulation system which comprises a flow dampening member positioned in front of the outlet which is configured to break the kinetic energy of a froth stream and to redirect the froth stream in a second direction that is substantially opposite to the first direction so that the froth is gently delivered out of the flow regulation system downstream of the outlet of the emulsifying chamber, wherein the coffee delivery outlet and steam frothing device are set on the machine so that they are, in a first position of the steam frothing device, distant one another of a distance effective to serve coffee and milk froth independently, the steam frothing device being so constructed and arranged to deliver milk froth in a substantially vertical manner, the steam frothing device being controllably moveable in a second position so that its delivery outlet can be moved closer to the vertical line of the coffee outlet in a manner that the milk froth can be delivered without substantially moving the cup underneath.

\* \* \* \* \*